Aug. 6, 1968  T. EKLUND  3,395,909

VACUUM-ENCLOSED ROTATABLE FURNACE

Original Filed May 31, 1963

INVENTOR.
TORSTEN EKLUND
BY
Bailey, Stephens & Huettig
ATTORNEYS 3,395,909
VACUUM-ENCLOSED ROTATABLE FURNACE
Torsten Eklund, Surahammar, Sweden, assignor to Allmanna Svenska Elektriska Aktiebolaget, Vasteras, Sweden, a corporation of Sweden
Continuation of application Ser. No. 284,451, May 31, 1963. This application Sept. 22, 1966, Ser. No. 581,395
Claims priority, application Sweden, June 1, 1962, 6,150/62
2 Claims. (Cl. 266—36)

This application is a continuation of copending application Ser. No. 284,451, filed May 31, 1963, now abandoned.

The present invention relates to a rotatable furnace for manufacture and/or treatment of steel or other metal or metal alloy.

Steel manufacture by means of refining of pig iron often occurs in rotatable furnaces, for example, with the known so-called Kaldo process, described, for example, in Murex Ltd. Review, 2:21, 1960, pp. 1–38, or Iron Steel Engi 37, Feb. 5, 1960, pp. 65–75. A rotatable furnace for such metallurgical purposes is mentioned in the U.S. Patent No. 3,169,775 and also partly described below and in accompanying drawing.

In order to further improve the quality of steel manufactured in different ways this has been degassed with different means generally by transferring it to a ladle, enclosed in a vacuum chamber, which is evacuated to a pressure below 100 torr., preferably below 50 torr. and until degassing takes place. In order to improve the degassing effect stirring or other surface exchange in the steel has also been arranged in several different ways.

The invention aims at an arrangement, with which a rotatable furnace according to the above is used also for degassing and is characterized in that the furnace is provided with a rotatable furnace body and a fixed vacuum-tight wall, provided with at least one gas evacuating conduit. This arrangement enables steel manufacturing and degassing to take place in the same space without intermediate transfer of the melt. The furnace rotation has a double task with this arrangement, partly the usual task for the refining process, partly the vacuum treatment (degassing) facilitating the continuous surface exchange with possibility of reaching the whole melt and not only parts of it. According to an advantageous embodiment of the invention the vacuum-tight wall is attached to a support, in which is placed loosely a rotatable furnace body of the type mentioned in the U.S. Patent 3,169,755, by which the space requirement of the ball is limited and tight connection can easily be effected.

Figure 1:
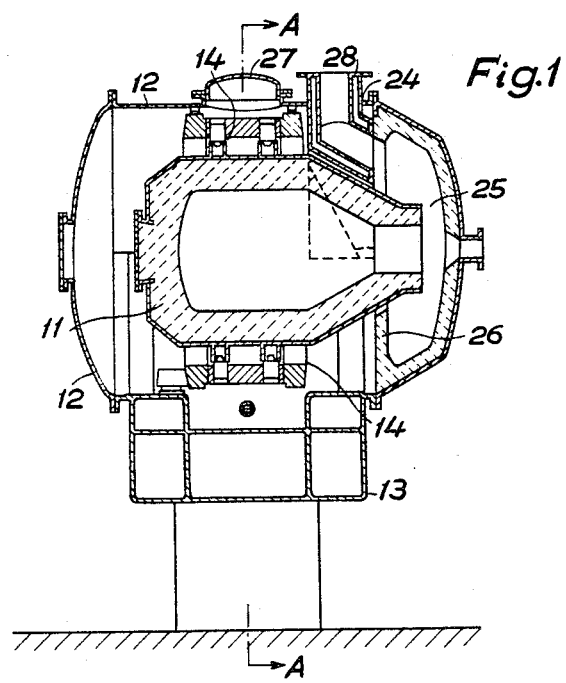
Figure 2:
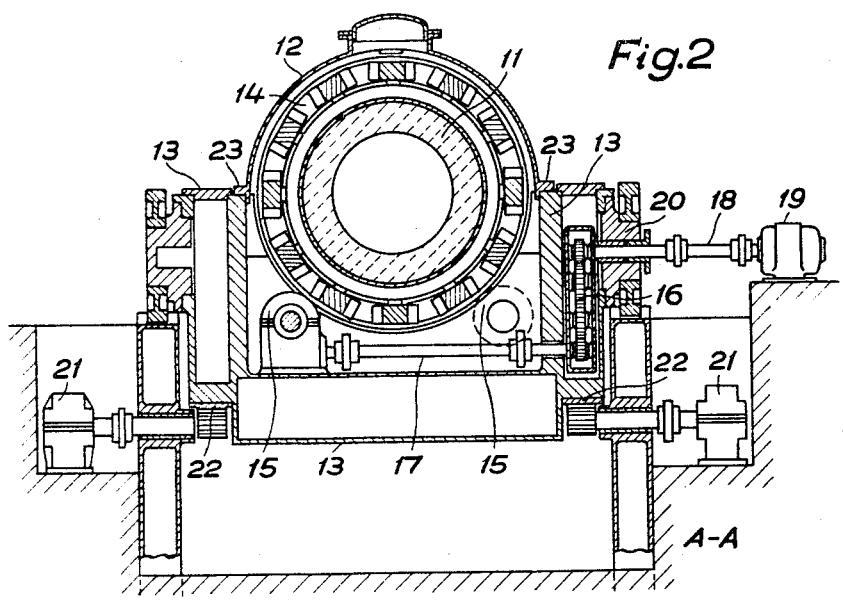

The invention is described more closely in accompanying figures, of which FIGURE 1 in section shows a cylindrical rotary furnace in a vacuum chamber and seen from the side. FIGURE 2 shows in section on the line A—A of FIG. 1 the same furnace, seen along the rotary axle.

A cylindrical rotary furnace 11 provided with suitable lining is mounted in a suitable way for rotation around a horizontal or inclined axis. The cylindrical rotary furnace may be made for steel manufacture by refining of pig iron in a way known per se, for example, during ore addition and oxygen blowing or in some other way. The furnace is enclosed in a vacuum-tight wall 12 situated around it. The furnace may suitably be loosely placed (support rollers along less than half the periphery) in a tiltable support stand 13 as mentioned in the U.S. Patent 3,169,755. The furnace is provided with roller rings 14 rolling against driving wheels 15 (which also serve as supporting rolls) situated in the support 13, driven through gear 16 and axles 17 and 18, from a motor 19. The axle 18 is vacuum-tightly brought through the turnable support trunnion 20 of the support. The support is tiltable by means of rotating motors 21 and toothed segment 22, for example, to position for pouring of the furnace or to position for lifting away the furnace out of the roller basket with the roller rings 14 (180° revolution between end positions). Suitable rotation speed during vacuum treatment is about one r.p.m.

The vacuum tight wall 12 is detachably positioned around the whole or the main part of the furnace 11. In the case shown the lower part of the support forms part of this wall, with the flanges 23 attached to the rest of the wall 12. The wall may be made in several mutual detachably connected sections.

At 24 one (or several) vacuum suction conduits 28 are attached, in the case shown running from a forward part of the vacuum chamber 25 adjacent the furnace spout. 28 may also be attached directly to the forward part 25 of the vacuum chamber. This part of the vacuum chamber is shielded from parts lying behind the spout by means of a shield 26 for heat radiation from the furnace and against gases running backwards from 25. At 27 an assembly opening is attached. The conduit 28 is water-cooled or cooled in some other way.

By the attachment at the support the space requirement for the vacuum wall 12 and thus the whole plant is minimal. The connection to the vacuum pump or pumps (not shown) is fixed with considerably simplified tightening conditions as a result.

In certain cases, however, it is also feasible to arrange the tiltable support and possibly transmission means inside a vacuum casing with fixed evacuation conduit.

An important advantage for the different embodiments within the scope of the invention is the relative freedom from the effect of asymmetries during rotation of the furnace.

Vacuum treatment with the arrangement is carried out in the following way.

After the pig iron refining in rotating furnace the vacuum space around the furnace is sealed and evacuated to 10 torr. at which time the furnace is rotated with a number of revolutions of about one r.p.m. During the refining a higher rotation speed is used, for example, 20–40 times greater, such as 30 r.p.m. By means of the permanent renewing of the melt surface by the furnace rotation the melt in its entirety is subjected to degassing and thus, for example, $H_2$, CO and $N_2$ are released. During the refining the melt is decarburised. By means of the degassing in vacuum below 100 torr., suitably below 50 torr., a steel is obtained which after stiffening is free from blisters and also in other respects of high quality without the inconveniences usual with earlier used methods. The number of revolutions may be controllable by the use of a direct current driving motor. Thus the number of revolutions during vacuum treatment is made greater than one r.p.m.

The arrangement according to the invention may be varied in different ways within the scope of the following claims. It is, for example, possible to charge the rotatable furnace with melt manufactured on another place and thereby only carry out degassing in the arrangement according to the invention.

I claim:
1. A rotatable furnace for metallic materials comprising a furnace body having a cylindrical portion and a spout remote from said cylindrical portion, a tiltable stand, rolls mounted in said stand carrying said cylindrical portion for rotation about the axis of said cylindrical portion, a vacuum-tight wall secured to said stand and enclosing said furnace body, and at least one gas evacuation conduit extending through said wall and communicating with the portion thereof adjacent said spout.

2. In a device as claimed in claim 1, a shield within said wall substantially closing off a first space within the wall adjacent said spout from the remainder of the space within the wall outside of the furnace body, said gas evacuation conduit communicating with said first space.

References Cited

UNITED STATES PATENTS

| | | | |
|---|---|---|---|
| 2,825,945 | 3/1958 | Ulrech et al. | 266—34 |
| 3,031,177 | 4/1962 | Hofmeister | 266—36 |

FOREIGN PATENTS

| | | |
|---|---|---|
| 813,581 | 9/1951 | Germany. |
| 576,924 | 5/1958 | Italy. |

CHARLIE T. MOON, *Primary Examiner.*